United States Patent [19]
Findley

[11] Patent Number: 5,751,212
[45] Date of Patent: May 12, 1998

[54] SIGNALING DEVICE

[76] Inventor: Craig Alan Findley, 20 S. First St., Sharpsville, Pa. 16150

[21] Appl. No.: 516,605

[22] Filed: Aug. 18, 1995

[51] Int. Cl.$^6$ ........................................... B60Q 7/00
[52] U.S. Cl. .................. 340/468; 340/471; 340/473; 40/586; 40/593; 116/63 P
[58] Field of Search ............................. 340/468, 463, 340/464, 471, 473, 469, 470, 321; 40/586, 591, 593, 610; 116/28 R, 42, 63 P

[56] References Cited

U.S. PATENT DOCUMENTS

| | | | |
|---|---|---|---|
| 2,288,747 | 7/1942 | Santora . | |
| 3,775,887 | 12/1973 | Precourt | 40/603 |
| 3,800,430 | 4/1974 | Samra . | |
| 4,305,062 | 12/1981 | Hogg, Jr. et al. | 340/309.15 |
| 4,430,638 | 2/1984 | Parker | 340/473 |
| 4,489,706 | 12/1984 | Scolari | 340/473 |
| 4,613,847 | 9/1986 | Scolari et al. | 340/473 |
| 4,631,516 | 12/1986 | Clinker . | |
| 5,363,092 | 11/1994 | Starchevich | 340/473 |

*Primary Examiner*—Edward Lefkowitz
*Attorney, Agent, or Firm*—Aileen Champion Addessi

[57] ABSTRACT

A signaling device provides a means for signaling an operator of a vehicle that the lights of that vehicle are distracting and annoying to an operator of another vehicle. The signaling device includes at least one display member having a message, such as "DIM LIGHTS", positioned thereon for conveying the message to the operator of the vehicle. The message may be constructed from a reflective or fluorescent material for enabling the lights of another vehicle to illuminate the message. The signaling device may be stored within the vehicle by attaching the signaling device to a sun visor of the vehicle with a clip. The signaling device may include a plurality of display members for conveying the message and at least one attachment member for attaching together the display members. The signaling device further includes a handle for enabling a person to manipulate the sign. The attachment members and the handle may be constructed of a flexible material for enabling the signaling device to be folded during storage. A fastener may be attached to the display members for securing together the components of the signaling device during storage of the signaling device.

3 Claims, 2 Drawing Sheets

SIGNALING DEVICE

BACKGROUND OF THE INVENTION

The invention relates to signaling an operator of a vehicle and, more particularly, to a signaling device which is positioned in a first vehicle for signaling an operator of a second vehicle to adjust the brightness of the lights of the vehicle.

While driving a vehicle, such as an automobile, truck, motorcycle, bus, or the like, often an operator of the first vehicle is distracted by the lights of a second vehicle. For example, the operator of the second vehicle may not be aware that the bright lights of the vehicle are on or that the fog lights of the vehicle are on in addition to the bright lights of the vehicle. These additional lights can be distracting and annoying to an operator of a motor vehicle, possibly leading to careless driving of the vehicle.

If the second vehicle is approaching the first vehicle head on, then the operator of the first vehicle may flip the bright lights of the vehicle on and off, repeatedly, to signal the operator of the second vehicle to check the lights of the second vehicle. However, if the second vehicle is approaching the rear end of the first vehicle, the operator of the first vehicle cannot safely signal the operator of the second vehicle to adjust the lights of the second vehicle. The operator may, for example, wave his or her arm or apply the brakes, however, these are unsafe practices during operation of a motor vehicle, and may increase the possibility of an accident.

U.S. Pat. No. 3,800,430 to Samra, U.S. Pat. No. 4,631,516 to Clinker, and U.S. Pat. No. 2,288,747 to Santora disclose vehicle signaling devices which are attached to a vehicle for signaling a person within another vehicle. The signaling devices are connected to the electrical system of the vehicle and light up a message when turned on. However, the signaling devices remain positioned in a fixed location within the vehicle.

Therefore, what is needed is a signaling device which safely signals an operator of a vehicle to dim the lights of the vehicle, which may be temporarily positioned in various locations within the vehicle, and which displays a message without the utilization of the electrical system of the vehicle.

SUMMARY OF THE INVENTION

A signaling device includes at least one display member having a first surface and a second surface and having a message positioned on at least one of the first and second surfaces. A handle is attached to at least one of the first and second surfaces of the display member and is sized and positioned for enabling a person to grasp the handle for manipulation of the signaling device.

The signaling device may further include a clip attached to the display member for enabling the signaling device to be attached to a supporting surface, at least one attachment member attached to a first display member and to a second display member for connecting together the first and second display members, and a fastener attached to at least one of the first and second display members for securing together the first and second display members during storage of the signaling device.

The message is positioned on one of the first and second surfaces and the handle is positioned on the other of the first and second surfaces. The message may include the words DIM LIGHTS or, alternatively, any expression for conveying to another person to adjust the brightness of their lights. The message may be constructed from a reflective material for illumination of the message by the lights of another vehicle.

The signaling device may include a first display member and a second display member, each of the first and second display members having at least a portion of the message positioned thereon. The attachment members and the handle are flexible and are sized and positioned so that one of the first and second display members is foldable toward the other of the first and second display members for storage of the signaling device. The fastener may include a first fastener member attached to the first display member and a second fastener member attached to the second display member and mateably connectable with the first fastener member for securing together the first and second display members.

BRIEF DESCRIPTION OF THE DRAWINGS

While the specification concludes with claims particularly pointing out and distinctly claiming the subject matter of the invention, it is believed the invention will be better understood from the following description, taken in conjunction with the accompanying drawings, wherein:

DESCRIPTION OF THE PREFERRED EMBODIMENT

The invention described herein provides an apparatus for signaling an operator of a vehicle to adjust the lights of the vehicle.

Figure 1:
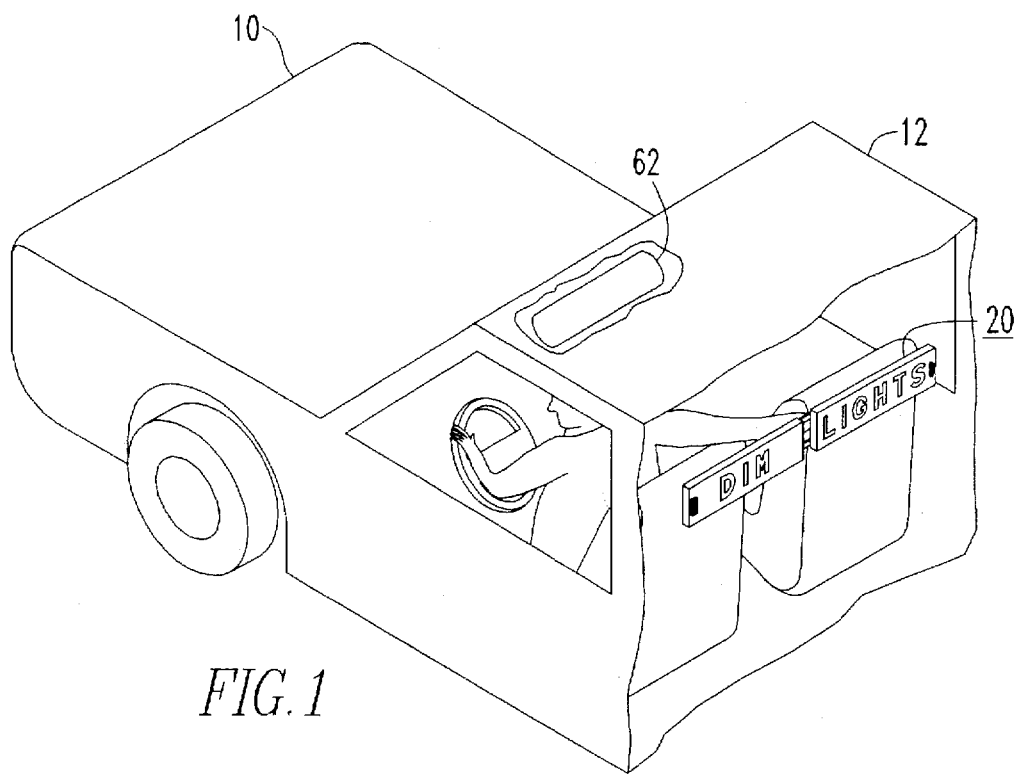
FIG. 1 is a fragmented isometric view of a signaling device being used by an operator of a vehicle.

Referring to FIG. 1, a vehicle 10 has a front portion 12. A sign or signaling device 20 may be used by an operator of the vehicle 10 for signaling to other persons to dim the lights of their vehicles (not shown).

Figure 2:
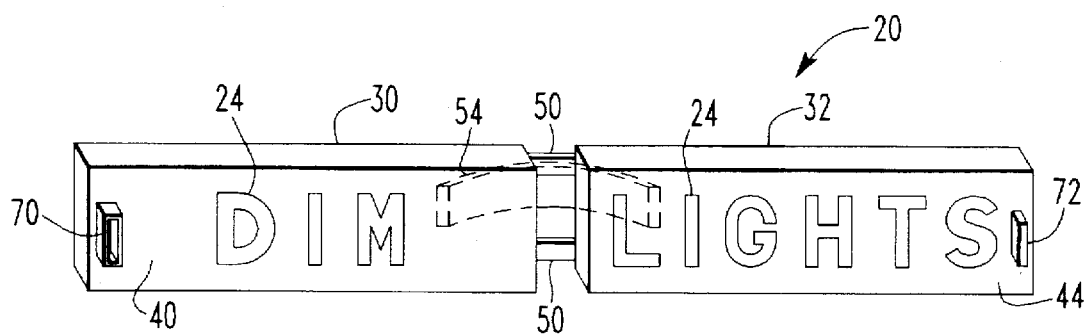
FIG. 2 is a front view of the signaling device having a message displayed thereon.
Figure 3:
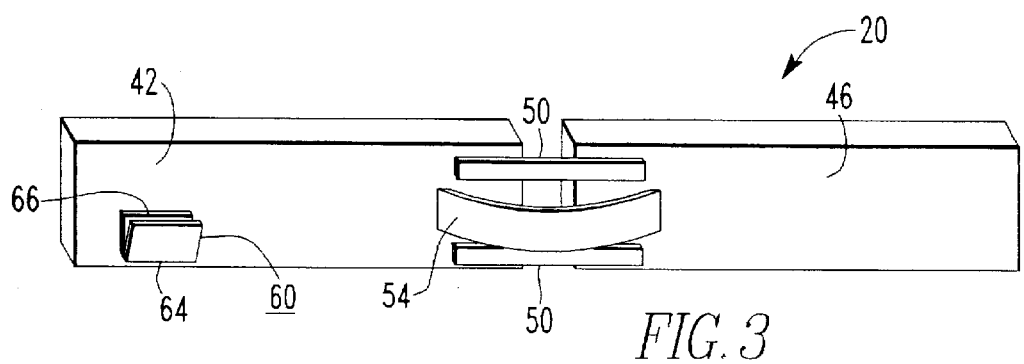
FIG. 3 is a rear view of the signaling device of FIG. 2.

Referring to FIGS. 2 and 3, the signaling device 20 includes a message 24, such as the words "DIM LIGHTS". The message 24 to be conveyed may include any combination of characters to form words or symbols, of any language, to adequately inform the operator of the vehicle that he or she should dim or adjust the lights of their vehicle. Alternatively, the message 24 may include any combination of words and/or symbols for displaying any desired expression or message to other persons, such as a message that the vehicle is parking, that the operator of the vehicle needs help, or the like.

The signaling device 20 includes a first display member 30 and a second display member 32. The first display member 30 has a first surface 40 and a second surface 42. The second display member 32 has a first surface 44 and a second surface 46. The message 24 is positioned on at least one of the first surfaces 40 and 44 and the second surfaces 42 and 46 of the first and second display members 30 and 32. As one example, the word DIM is positioned on the first surface 40 of the first display member 30 and the word LIGHTS is positioned on the first surface 44 of the second display member 32. As an alternative, the message 24 may be positioned on both of the first surfaces 40 and 44 and the second surfaces 42 and 46.

The first and second display members 30 and 32 may be constructed of various types of materials, such as plastic, cardboard, or the like, for providing a durable, lightweight sign for displaying a message to other persons. The words or symbols may be painted onto the first and second display members 30 and 32, for example by silk screen, may be strips of tape or decals attached to the first and second display members 30 and 32, may be etched onto the first and second display members 30 and 32, or the like.

The first surfaces 40 and 44 of the first and second display members 30 and 32 are preferably a contrasting color as compared to the message 24 positioned thereon. The surfaces 40 and 44 and the message 24 may be any combination of colors and materials, such as fluorescent, reflective, orange, black, yellow, or the like. Preferably, the surfaces 40 and 44 are white and the message 24 includes reflective letters. Utilization of reflective materials on the first and second display members 30 and 32 allows a vehicle's lights to be reflected from the signaling device 20 for illuminating the message 24 and enabling an operator of the vehicle to read the message 24 while driving at night.

The signaling device 20 includes at least one attachment member 50 for connecting together the first display member 30 and the second display member 32. The attachment member 50 may be an elongated piece of material having a first end which is attached to one of the display members 30 and 32 and a second end which is attached to the other of the display members 30 and 32. Preferably, the attachment member 50 is constructed from a flexible material, such as plastic, nylon, leather, vinyl, or the like for enabling one of the first and second display members 30 and 32 to be folded toward the other of the first and second display members 30 and 32.

Referring to FIG. 3, the attachment members 50 are attached to the second surfaces 42 and 46 of the first and second display members 30 and 32. Alternatively, the attachment members 50 may be attached to the first surfaces 40 and 44 or to the periphery surface extending between the first and second surfaces of the first and second display members 30 and 32. The attachment members 50 may be connected to the display members 30 and 32 mechanically, such as by rivets, adhesively, molded into the material of the display members 30 and 32, or the like.

The signaling device 20 includes a handle 54 for enabling a person to grasp the handle 54 for manipulation of the signaling device 20. Preferably, the handle 54 is attached to a side of the display members 30 and 32 opposite to the message 24, such as the second surfaces 42 and 46. The handle 54 may have a first end attached to the first display member 30 and a second end attached to the second display member 32, which also provides additional support to the attachment members 50. Alternatively, the handle 54 may be attached at any convenient position on the display members 30 and 32 for enabling the signaling device 20 to be held in such a position to alert other persons of the message 24 positioned thereon.

Preferably, the handle 54 is constructed from a flexible material, such as plastic, nylon, leather, vinyl, or the like for enabling one of the first and second display members 30 and 32 to be folded toward the other of the first and second display members 30 and 32 during storage of the signaling device 20. The handle 54 may be connected to the display members 30 and 32 mechanically, such as by rivets, adhesively, molded into the material of the display members 30 and 32, or the like.

The signaling device 20 further includes a clip 60 for securing the signaling device 20 to a supporting surface, such as a sun visor 62 of the vehicle 10. The clip 60 may be any type of fastener and constructed from any type of material, such as metal, plastic, or the like. The clip 60 may be connected to at least one of the display members 30 and 32 mechanically, such as by rivets, adhesively, molded into the material of the display members 30 and 32, or the like. The clip 60 is attached to an outside surface, such as the second surface 42 or 46 of the display members 30 and 32, of the signaling device 20 when the signaling device 20 is in the folded position. The clip 60 has a closed end 64 and an open end 66, which is engagable with the supporting surface or sun visor 62. The closed end 64 provides a contact point for supporting the signaling device 20 on the supporting surface.

The signaling device 20 is sized and adapted so that when the first and second display members 30 and 32 are folded together and the signaling device 20 is in a storage configuration, the signaling device 20 is substantially concealed behind the sun visor 62 of the vehicle 10 when the sun visor 62 is in a non-use position.

The signaling device 20 additionally includes a fastener, which may include a first fastener member 70 sized and positioned to be mateably engagable with a second fastener member 72. The first fastener member 70 is attached to the first display member 30, such as to the first surface 40, and the second fastener member 72 is attached to the second display member 32, such as to the first surface 44, for enabling the first and second display members 30 and 32 to be secured together during storage of the signaling device 20. The fastener may be connected to the display members 30 and 32 mechanically, such as by rivets, adhesively, molded into the material of the display members 30 and 32, or the like. The fastener may be any type of connector means, such as a clip, fibrous adhesive patches marketed under the tradename Velcro, or the like, and may be constructed of any type of material, such as metal, plastic, cloth, or the like.

For the various embodiments of this invention, the same reference characters will be used to designate like parts. In addition, like functions and like interactions of the parts among the various embodiments of this invention will not be repeated for each embodiment.

Figure 4:
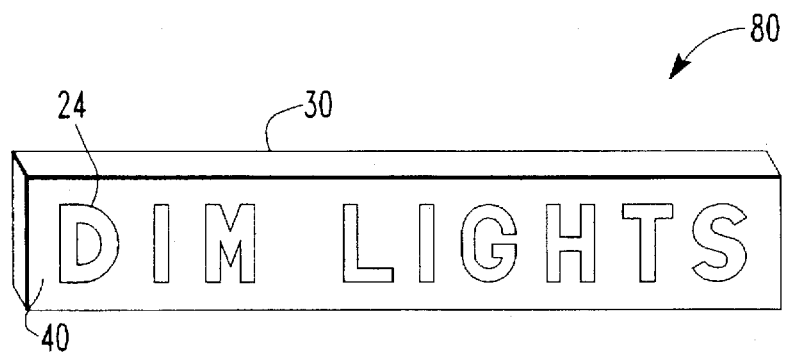
FIG. 4 is a front view of an alternative embodiment of the signaling device.
Figure 5:
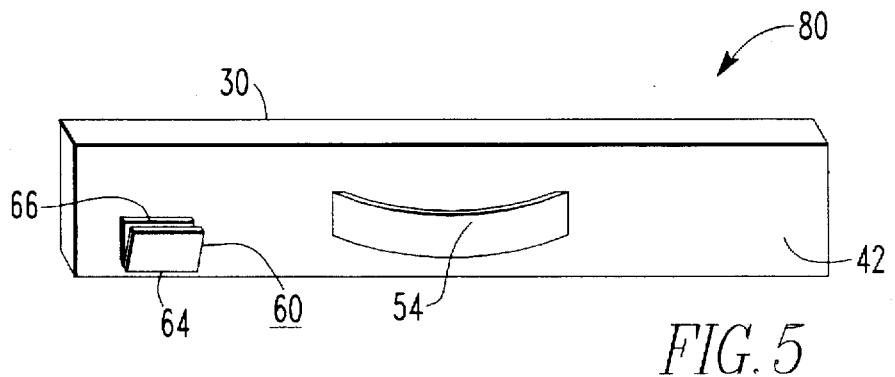
FIG. 5 is a rear view of the alternative embodiment of the signaling device of FIG. 4.

Referring to FIGS. 4–5 and using the same reference characters to define like parts, an alternative embodiment of the signaling device 20 as illustrated in FIGS. 2–3 may be a signaling device 80 having like parts as the signaling device 20 and having the message 24 displayed on a single display member, such as the first display member 30. The signaling device 80 is sized and adapted to be concealed by the sun visor 62 in a folded or unfolded storage configuration. The handle 54 of the signaling device 80 may be constructed of a rigid material or a flexible material for enabling the signaling device 80 to be folded or unfolded in the storage configuration. Another alternative embodiment of the signaling device 20 includes having the first and second display members 30 and 32 telescopically fit together.

In operation, when a second vehicle approaches the first vehicle 10 from behind with, for example, bright lights or fog lights on, the operator of the first vehicle 10 may conveniently reach to the sun visor 62, slide the signaling device 20 from behind the sun visor 62, grasp the handle 54, and face the surface of the signaling device 20 with the message 24 towards the operator of the second vehicle for conveying the message 24 to the operator of the second vehicle. The lights of the second vehicle will illuminate the message 24 for enabling the operator of the vehicle 10 to read the message 24.

The signaling device 20 should be positioned within the vehicle 10 in such a position and in such a manner that all applicable laws are complied with and so that the operator's view from the vehicle 10 is unobstructed. The signaling device 20 may be used to convey a message to any intended observer, including someone positioned outside of a vehicle.

An advantage of the use of the signaling device 20 is that an operator of a vehicle may signal to another vehicle that that vehicle is distracting and annoying the operator of the first vehicle. The signaling device 20 gives the operator of the first vehicle a means for notifying an operator of the second vehicle, which is located behind the first vehicle, that his or her lights are too bright. Usage of the signaling device 20 helps ensure the safety of all operators of vehicles, for example by preventing distracting bright lights behind an operator helps that operator to drive more safely, which in turn reduces the possibility of an accident to the other operators due to an error of the first operator.

Another advantage of the signaling device 20 is that the signaling device does not require the use of batteries or any electrical system. The headlights of another vehicle or any other lights within the vicinity of the signaling device 20 will reflect from the first and second surfaces or the message for illuminating the sign to enable the message to be visible and readable at night.

Thus there has been shown and described a novel signaling device which fulfills all the objects and advantages sought therefor. Many changes, modifications, variations and other uses and applications of the subject invention will, however, become apparent to those skilled in the art after considering this specification together with the accompanying drawings and claims. All such changes, modifications, variations and other uses and applications which do not depart from the spirit and scope of the invention are deemed to be covered by the invention which is limited only by the claims which follow.

I claim:

1. A signaling device for use within a first vehicle for signaling a person positioned in a second, following vehicle having lights, comprising:

a first display member having a portion of a message positioned thereon, said message including letters positioned in an upright position when said first display member is held in a horizontal position;

a second display member positioned separated from said first display member and having a portion of said message positioned thereon, said message including letters positioned in an upright position when said second display member is held in a horizontal position;

said message conveying an expression to the person positioned within said second, following vehicle to adjust the brightness of said lights of said second automobile;

a first attachment member, being separate from said first and second display members, connected to said first display member and connected to said second display member;

a second attachment member, being separate from said first and second display members, positioned in spaced apart relation to said first attachment member and connected to said first display member and connected to said second display member, said first and second attachment members attaching together said first and second display members and foldable for enabling said first and second display members to fold toward each other for storage of said signaling device; and a handle attached to said first display member and to said second display member, said handle foldable for enabling said first and second display members to fold toward one another for storage of said signaling device.

2. The signaling device according to claim 1, further comprising a clip attached to one of said first and second display members for enabling said signaling device to be attached to a supporting surface.

3. The signaling device according to claim 1, wherein said message is constructed from a reflective material.

* * * * *